March 6, 1962  J. A. McDOUGAL ETAL  3,023,905
COMBINED STRAINER AND FUEL TANK "EMPTY" SIGNALING DEVICE
Filed Oct. 23, 1959

INVENTORS
John A. McDougal &
BY John D. McMichael

S. C. Thorpe
ATTORNEY

3,023,905
COMBINED STRAINER AND FUEL TANK "EMPTY" SIGNALING DEVICE

John A. McDougal, Flint, and John D. McMichael, Swartz Creek, Mich., assignors to General Motors Corporation, Detroit, Mich., a corporation of Delaware
Filed Oct. 23, 1959, Ser. No. 848,435
4 Claims. (Cl. 210—172)

This invention relates to liquid storage tanks such as gasoline tanks of automotive vehicles from which delivery is effected by a suction tube extending into the tank, and particularly to strainers for filtering the suction tube intake and signaling when the liquid level in the tank has decreased to a predetermined low level.

Strainers attached to the suction intake tube within such tanks have been in common use heretofore, including strainers made of flexible fabric material having the property of selectively passing fuel while blocking intake of water as well as sediment, dirt, etc. Because of this gasoline/water selectivity, fuel strainers made of this material may be located in the tank closely adjacent the bottom wall in order that the full capacity of the tank may be utilized without risk of drawing an excessive amount of water into the fuel line to the vehicle engine.

The principal object of the invention is to improve such strainers in order to effect an automatic signaling of the liquid level in the tank decreasing to a predetermined height. In the case of an automotive vehicle the driver is thus warned that he is about to run out of gasoline, however, the invention will still permit him to proceed a reasonable distance to a filling station, driving at a reduced speed.

In accordance with the invention, a hollow strainer of the aforementioned material is provided which has upper and lower compartments separated by a partition. The suction tube intake extends into the upper compartment of the strainer and terminates therein a short distance above the partition. The lower compartment of the strainer thus extends below the suction tube, and preferably to the bottom of the tank in order that the full capacity of the tank may be utilized. A restricted passageway, most conveniently formed as an orifice in the partition, interconnects the two compartments. Thus, all fuel entering the suction tube intake is filtered, but by reason of the partition and the restricted passage the rate at which filtered fuel may be withdrawn by the suction tube is substantially curtailed after the fuel level in the tank drops below the height of the partition. Continued operation, however, may be had at the curtailed rate.

The invention will be more clearly understood from the following description of one preferred embodiment thereof selected for illustration, having reference to the drawing, wherein.

Figure 1:
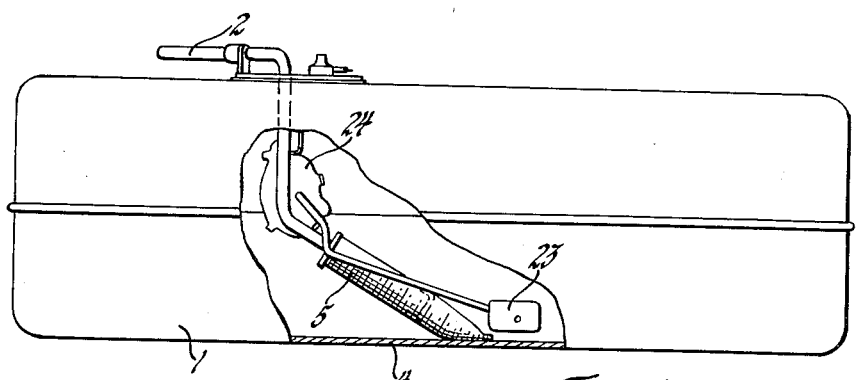
FIGURE 1 is an elevational view of an automotive vehicle fuel tank with a portion of its side wall broken away to illustrate the mounting of the fuel strainer therein.

Referring now in detail to the drawing, numeral 1 designates a conventional gasoline storage tank of the type commonly mounted on the frame (not shown) of automotive vehicles. Fuel contained within the tank is withdrawn via a suction tube 2 leading to the vehicle engine (not shown), which tube extends into the tank with its lower end 3 terminating in spaced relation above the tank bottom wall 4. The tank, including the bottom wall 4, is constructed of rigid metal or other material of sufficient strength to support the fuel therein against the inertia and vibration forces imposed during vehicle operation. Surrounding the suction tube, adjacent its lower end, is the improved strainer 5. This is formed of flexible material, preferably polyvinylidene chloride available commercially under the designation "Saran," extruded to .010 diameter yarn and woven to 90 x 46 count. The resulting fabric or cloth is then calendered with sufficient force to produce a pressure drop of 3.50 to 7 inches of water when passing 10 cubic feet of air (corrected to .08 pound per cubic foot density at 32° F. and 14.696 pounds per square inch atmospheric pressure) through a three inch diameter double thickness section of the cloth. Two such thicknesses 6 and 7 are shown in magnified form in FIGURE 3, the warp threads 6' and woof threads 6" of the one layer 6 extending parallel with the corresponding threads 7' and 7" of the other layer 7. The elongated hollow body of the strainer 5 is formed of such material, the body initially being tubular in shape throughout its length. Into the upper end thereof is inserted an annular bushing 8 of metal or other rigid material having a bore 9 snugly embracing the suction tube 2 and an external flange 10 which is reversely bent to clampingly support and close that end of the strainer. The suction tube extending through the bushing 8 forms the single opening for fuel flow from the strainer. The opposite end is diametrically flattened as indicated at 11 in FIGURE 2, the portion 12 of the body adjacent this flattened end section being gradually tapered as shown. Sealing of the end section 11 is effected most conveniently in the case of the aforementioned "Saran" cloth by well known dielectric heating means, although such sealing may otherwise be done by the use of adhesive between the pressed together surfaces, or by stapling the same, etc. The length of the strainer body 5 is selected so that when attached by the bushing 8 to the suction tube 2 the lower end 12, 11 of the strainer over-extends the spacing between the tube end 3 and the bottom wall 4 of the tank, whereby the lower end of the strainer lies against the tank wall 4 to insure their remaining in abutting engagement with each other. Because of the flexibility of the strainer body and the absence of any rigid reinforcing means in effecting the closure of its lower end section 11, such abutting contact with the bottom wall 4 can be maintained without danger of the strainer wearing a hole through the tank during vehicle operation.

Intermediately placed between the closed lower end 11 and the bushing 8, the strainer body has its interior separated into upper and lower compartments 13 and 14, respectively, by a partition 15. This partition, shown in the form of a cup, is made of any suitable plastic or other relatively rigid material which is impervious to the hydrocarbon fuel or other liquid in the tank. The side walls 16 of the cup are sealed to the "Saran" fabric side walls of the strainer body 5 as by dielectric heating of the latter while pressing it circumferentially about the cup to form a permanent bond therebetween as indicated by the annular depression of the cloth at 17. To insure added support for the cup 15 and positive spacing of its bottom wall 18 from the lower or intake end 19 of the suction tube, there are provided radially and axially spacing vanes 20 which may be molded integrally with the side and bottom walls of the cup. These vanes 20 thus extend radially between the tube and the cup side 16, and axially between the lower end 3 of the tube and the bottom wall 18 of the cup.

The tube intake end 3 terminating within the upper compartment 13 provides an unrestricted flow connection between this compartment and the tube. Providing the only interconnection for flow between the lower compartment 14 and the upper compartment 13 of the strainer is a restricted passage which is most conveniently formed as an orifice 21 extending centrally through the cup bottom wall 18. The inner ends 22 of the spacer vanes 20 terminate in spaced relation from each other so as not to interfere with the flow of fuel through this restricted orifice 21.

Figure 2:
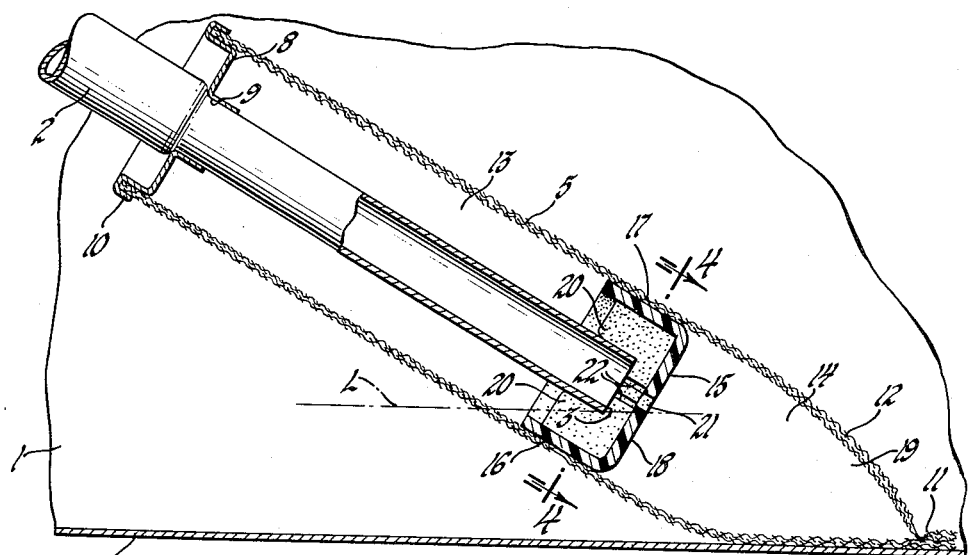
FIGURE 2 is an enlarged fragmentary view similar to FIGURE 1 but showing the fuel strainer and the lower portion of the suction tube in longitudinal section.
Figure 3:
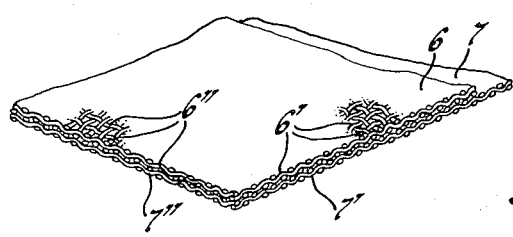
FIGURE 3 is a further enlarged fragmentary view of the material from which the hollow body portion of the strainer is made.
Figure 4:
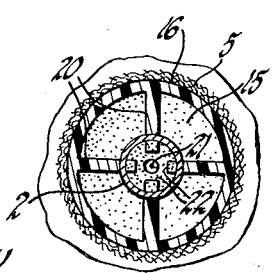
FIGURE 4 is a transverse sectional view of the strainer, taken substantially on the line 4—4 of FIGURE 2.

During operation, when the vehicle is driven at cruise or relatively high speeds (e.g., above 30 miles per hour) with a level of fuel in the tank above the height of the partition 15, as represented by the "low fuel level" line L in FIGURE 2, the fuel requirements of the engine will be amply met by passage of fuel from within the tank through the side walls of the strainer upper compartment 13 and directly into the intake end 3 of the tube 2 under suction imposed by the usual engine fuel pump (not shown) at the opposite end of the tube 2. Because of the selectivity of the "Saran" cloth permitting passage of gasoline to the extrusion of water and the resistance of this material to passage of air when wetted, the suction existing within the upper compartment 13 will continuously maintain a sufficient head of gasoline to keep the intake end 3 of the fuel tube submerged. Simultaneously, gasoline will also be drawn in to the lower compartment 14 of the strainer, through its side walls and thence through the orifice 21 into the upper compartment 13. The delivery of fuel from this lower compartment is greatly restricted, however, by the small size of the orifice 21 (on the order of .050 inch diameter as compared with, say, the 5/16 inch diameter of the tube intake 3). After continued operation at such speeds and the fuel level reaches the line L, no more fuel (neglecting splash effects within the tank) may enter the upper compartment 13 directly through its side walls, and the only fuel reaching the upper compartment for withdrawal by the suction tube will be that which passes into the lower strainer compartment 14 through its side walls and thence through the orifice 21. As the result, the flow into the tube from the strainer is substantially reduced below the fuel requirements of the vehicle engine for operation at the previous speed, and the engine will therefore begin to "miss," serving to signal to the driver that he has only a relatively low supply of fuel in the tank. However, by reducing the power demands on the engine he is permitted to proceed at a reduced speed for a number of miles to reach a filling station. The partition 15 in conjunction with the restricted orifice 21 thus operates to limit the rate at which fuel may be drawn into the strainer upper compartment 13 when the "low fuel level line" L is reached, after which continued vehicle operation is permitted only at a reduced speed. Without the partition 15 or equivalent means for so separating the strainer into two compartments it has been found that the wettability of the strainer side walls and the resistance to passage of air therethrough when wetted results in fuel being drawn into the strainer to a height substantially exceeding that of the intake end 3 of the tube, notwithstanding the fuel level in the tank being substantially below that height. With such partitioning of the strainer, however, the desired results of signaling a low fuel level condition are obtained.

It will be understood that the upper portion of the tank is vented to atmosphere, which vent may be in the form of simply an opening in the usual tank filler cap (not shown). The conventional float 23 and its associated fuel level indicating mechanism 24 in FIGURE 1 form no part of the instant invention, but are shown merely as illustrating the need for some such device to indicate fuel level heights above that at which the "low level" signaling action of the strainer is intended to function.

While only a single preferred embodiment of the invention has been disclosed, it is appreciated that numerous minor changes in the construction and arrangement of the parts may be made without departing from the spirit and scope of the invention as defined in the following claims.

We claim:

1. In a strainer for use at the suction tube intake within a liquid storage tank and through which liquid is withdrawn from the tank, a hollow body of material which is readily wetted and is permeable to passage of liquid therethrough but resistant to passage of air therethrough when wetted, a partition extending generally transversely of and defining upper and lower compartments of the body, said upper compartment having an opening adapted to sealingly receive the intake end of the tube, said partition having an orifice interconnecting said compartments accommodating liquid flow at a substantially restricted rate relative to the rate at which liquid may flow into the tube from the upper compartment.

2. In a strainer for use at the suction tube intake within a liquid storage tank and through which liquid is withdrawn from the tank, a hollow body of material which is readily wetted and is permeable to passage of liquid therethrough but resistant to flow of air therethrough when wetted, a partition extending generally transversely of and defining upper and lower compartments of the strainer, said upper compartment having an opening adapted to sealingly embrace the tube for a relatively unrestricted flow connection between the intake end of the tube and the interior of said upper compartment, whereby with a predetermined suction applied to the tube liquid may be withdrawn from the tank at a normal rate when the liqued level in the tank is above said partition, said partition having an orifice defining a relatively restricted flow connection between said compartments whereby with said same suction applied the rate of withdrawal of liquid is reduced when the liquid level in the tank is below said partition.

3. In a strainer for use with a suction tube having an intake for withdrawing liquid hydrocarbon fuel from a storage tank, a hollow body of generally tubular shape adapted to surround the tube and extend below the tube intake within the tank, means adapted to sealingly connect the upper end of the body to the tube, said body being closed at its lower end by a diametrically flattened section thereof adapted to abut the bottom of the tank, the side walls and said flattened end section of the body being made of flexible material which is readily wetted by hydrocarbon fuel but not by water and is resistant to passage of air therethrough when wetted, and a partition extending generally transversely of and defining upper and lower compartments of the body with only the upper of said compartments adapted to be in open communication with the intake of the tube whereby fuel at any level within the tank above said partition may pass through the side walls of the upper compartment and be withdrawn from the tank via the tube at a relatively high rate in response to a predetermined suction applied to the tube, and a restricted passage interconnecting said compartments and limiting withdrawal of fuel to a relatively low rate when the fuel level in the tank is below said partition.

4. In a strainer for use at the suction tube intake within an automotive vehicle fuel tank, an elongated hollow member having side walls of material which is readily wetted by hydrocarbon fuel but not by water and which is resistant to passage of air therethrough when wet, said member having closed upper and lower ends with an opening adjacent the upper end adapted to snugly embrace the fuel suction tube, and a generally transverse partition extending between the side walls of said member and defining respective upper and lower compartments thereof, said partition having an orifice providing a greater restriction to fuel flow therethrough than that of the side walls of either said compartments, whereby with said strainer installed in the tank and a predetermined suction applied at the tube intake in said upper compartment fuel will enter said upper compartment at a first rate by passing through the side walls of said upper compartment until the fuel level in the tank decreases to the height therein of said partition, whereupon fuel may enter said upper compartment only by first passing through the side walls of the lower compartment and thence through said orifice at a second rate substantially less than said first rate.

References Cited in the file of this patent

UNITED STATES PATENTS

| | | | |
|---|---|---|---|
| 1,199,628 | Stauffer | Sept. 26, | 1916 |
| 1,694,743 | Hinman | Dec. 11, | 1928 |
| 2,548,965 | Gaugler | Apr. 17, | 1951 |
| 2,664,278 | Aghnides | Dec. 29, | 1953 |
| 2,788,125 | Webb | Apr. 9, | 1957 |
| 2,810,482 | Kasten | Oct. 22, | 1957 |